Feb. 26, 1963  T. W. MERRITT ET AL  3,078,870
VACUUM REGULATOR

Filed May 29, 1959  2 Sheets-Sheet 1

Inventors
Thomas W. Merritt
Chester A. Thomas
By
Hofgren, Brady, Wegner,
Allen & Stellman
Attorneys

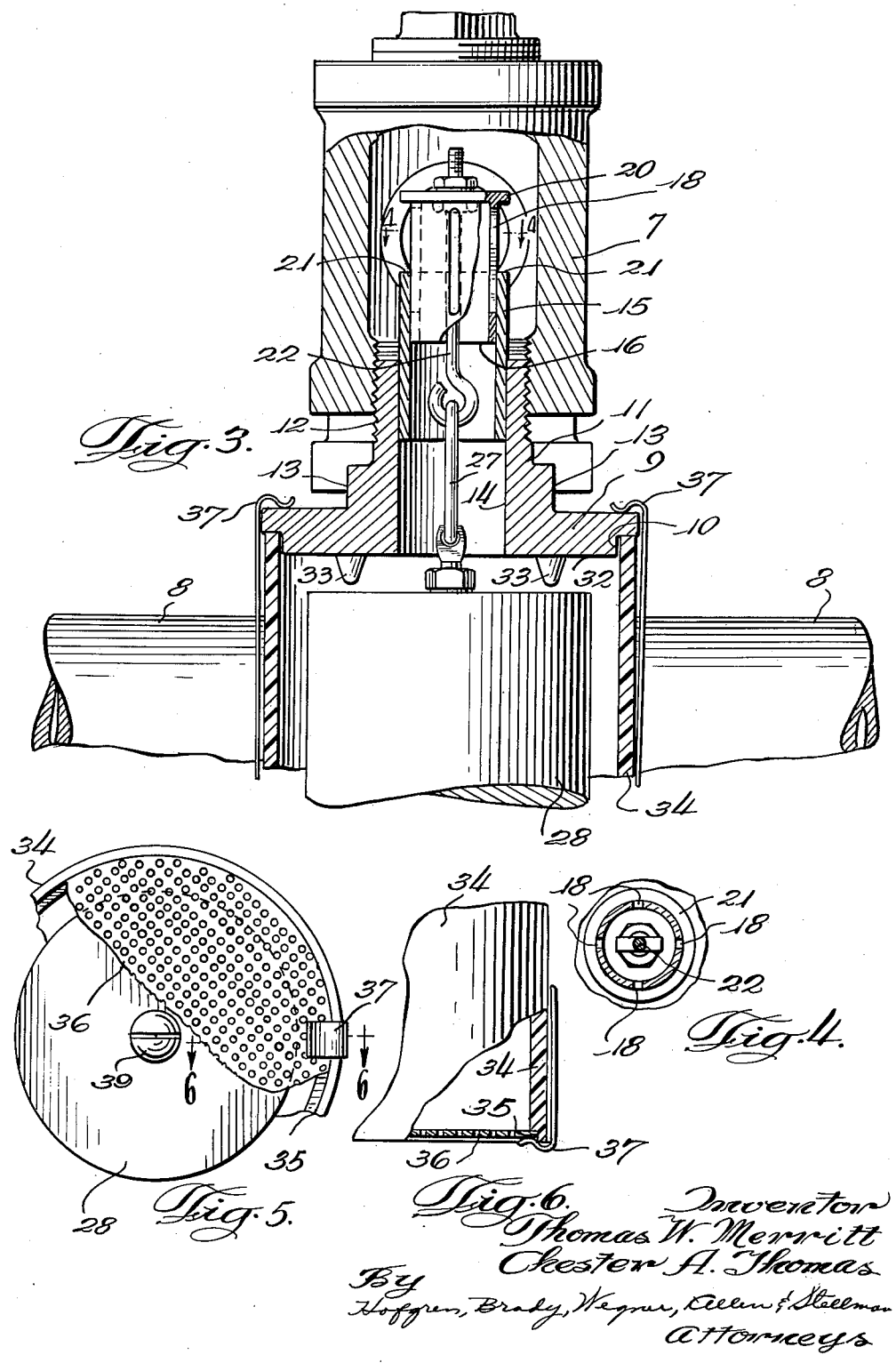

United States Patent Office 3,078,870
Patented Feb. 26, 1963

3,078,870
VACUUM REGULATOR
Thomas W. Merritt, St. Charles, and Chester A. Thomas, Lake Forest, Ill., assignors to Babson Bros. Co., a corporation of Illinois
Filed May 29, 1959, Ser. No. 816,819
4 Claims. (Cl. 137—534)

This invention relates to a regulator and more particularly to a vacuum regulator that will maintain a relatively uniform vacuum throughout an automatic milking system, regardless of load changes due to varied operating conditions.

In an automatic milking system, a number of milking units may be connected to a vacuum line. For best milking operation, the vacuum level within the system should be relatively constant. However, each time a milker unit is connected to or disconnected from the vacuum pipeline, there is a decrease or increase in the vacuum level. A vacuum regulator is connected with the pipeline to counteract these changes and to maintain a relatively uniform level of vacuum regardless of other changes in operating conditions as in the voltage to the motor driving the vacuum pump.

The preferred level of vacuum at the milker unit is equivalent to that required to support a thirteen inch column of mercury, usually referred to as "thirteen inches of vacuum." To keep the system at this predetermined level, the regulator valve is usually installed in the vacuum line, preferably as near the vacuum pump as possible and is adjusted for a higher level of vacuum depending on the length of the pipeline. It has been determined that the nearer the regulator is placed to the vacuum pump, the easier it is to maintain a more uniform vacuum. The principle of operation of such a regulator is that when the vacuum rises above the predetermined level, a valve opens and allows air to bleed into the vacuum line, maintaining the vacuum constant at the desired level.

In the past it has been found that the commonly known regulators for this use were neither responsive nor accurate enough to give optimum results.

A primary object of the present invention is to provide a new and improved vacuum regulator, for maintaining a relatively uniform vacuum in an automatic milking system.

Another object is to provide a vacuum regulator with a valve having a flow passage, the area of said passage increasing as the valve opens in order that the valve will be more responsive to changes in the system and will work more rapidly and more sensitively to adjust the vacuum to the predetermined level.

A further object is to provide a vacuum regulator having a valve controlled by a weight flexibly depending from the valve to give a more accurate and uniform control of the vacuum, in that the valve member has less tendency to bind in its guide.

A still further object is to provide a vacuum regulator of simple and economical construction, easy to assemble and maintain.

Other features and advantages of the invention will readily be apparent from the following specification and from the drawings, in which:

FIG. 3 is similar to FIG. 2, but shows the valve partly in section and in a more open position;

FIG. 4 is a fragmentary sectional view of the valve member taken substantially along line 4—4 of FIG. 3;

FIG. 5 is a fragmentary bottom view of the vacuum regulator; and

FIG. 6 is a fragmentary view, partly in section, of the vacuum regulator housing taken substantially along line 6—6 of FIG. 5.

Figure 1:
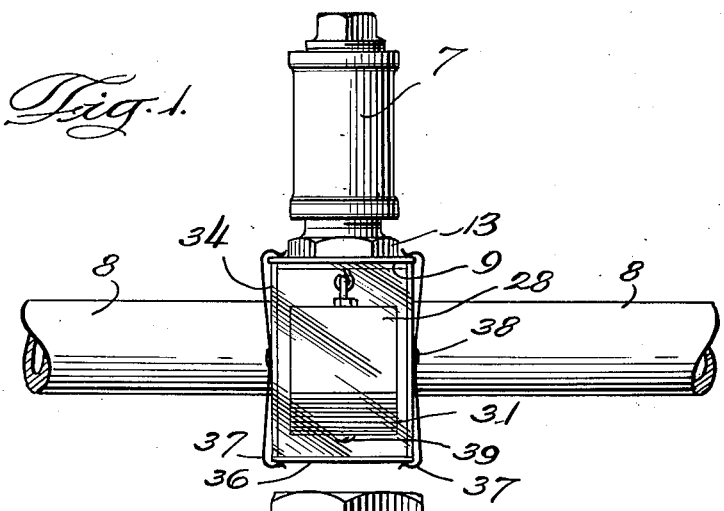
FIG. 1 is an elevational view of an embodiment of the vacuum regulator connected to a pipeline.

Referring to the drawings and particularly to FIG. 1, the vacuum regulator is shown connected to the lower opening of a T 7 which is connected to a pipeline 8 through a nipple and elbow 19, arranged so that the axis of the vacuum regulator will be in a generally vertical plane, with the upper portion of the vacuum regulator above the pipeline. The pipeline 8 is connected to a vacuum pump and chamber, not shown, at one end, and valves or stall cocks, not shown, are spaced along the line for connection with milker units.

Figure 2:
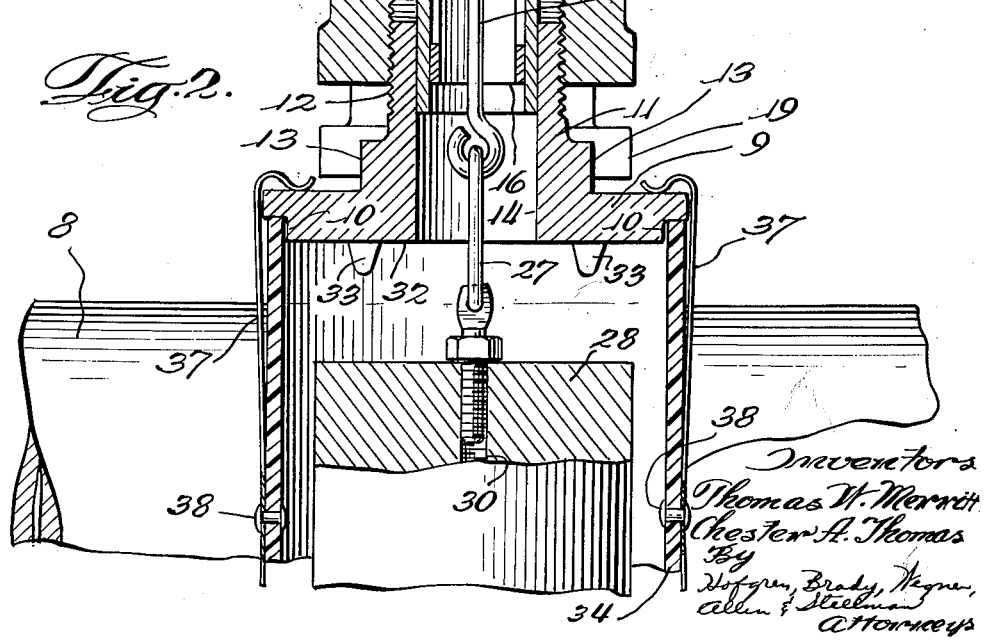
FIG. 2 is an enlarged longitudinal sectional view taken along the center line of the pipeline and vacuum regulator of FIG. 1, showing the valve of the vacuum regulator in a partially open position.

Referring now to FIGS. 2, 3 and 4, the illustrated embodiment of the vacuum regulator includes a round cast plate 9, having a stepped edge 10. The upper side of the plate is provided with a centrally disposed boss 11, the upper portion 12 of which is externally threaded to mate with the internal thread of the lower opening of T 7. The lower portion of boss 11, adjacent the plate, has generally flat sides 13 to receive a tool, such as a wrench, for connecting the threaded portion 12 of the boss 11 into the T 7, and thereby hold the vacuum regulator device in position on the pipeline 8. A cylindrical bore 14 through the boss 11 and plate 9 provides communication from one side of the plate to the other side. A cylindrical bushing 15 as of brass or like material, is fitted into the upper portion of the bore 14, with the uppermost edge 21 of the bushing extending above the boss. An elongated valve member 16 is sildably received by bushing 15. Valve member 16 is open at one end and closed at the other end except for a small centrally disposed bore 17, and has a plurality of longitudinal slots 18 in the wall, and an outwardly extending annular flange 20 at its closed end which seats on the uppermost edge 21 of bushing 15 when the system is at rest.

A pair of flexibly joined connecting pins 22 and 27 are secured to the closed end of valve member 16 through the small bore 17. A main weight 28 is flexibly connected to the lower extent of connecting pin 27 and depends therefrom. The weight 28 is preferably of a weight which maintains a vacuum system at twelve and one-half inches vacuum. To bring the system to the desired level of thirteen inches vacuum, individual disc weights 31 are connected to the bottom of the main weight 28 by a screw 39 secured into the lower extent of the threaded bore 30 of the main weight 28. Each one of these disc weights 31 allows an additional one-fourth inch of vacuum to be built up within the system. It has been found that a weight flexibly suspended from the valve member in this manner gives a more accurate and uniform control of the vacuum within the system and that the valve member has less tendency to bind in guide bushing 15.

The side of the plate 9 opposite the boss 11 is the lower side 32 when the vacuum regulator is connected in position, and is provided with a plurality of downwardly projecting lugs 33, which serve as a stop for weight 28 when it is moved upwardly by the vacuum. Lugs 33 prevent weight 28 from seating against the underside 32 of plate 9 which may block the air flow through the valve.

A cylindrical sleeve 34 of transparent material, as plastic or glass, is seated in the stepped edge 10 of the plate 9, extending downwardly therefrom and held in place by spring clips 37 which engage plate 9. Sleeve 34 provides a housing for the weight 28, through which operation of the valve can be observed.

Referring to FIGS. 5 and 6, an annular recess 35 is provided on the inside surface of the transparent sleeve 34 at the lower extent thereof. A perforated closure or screen 36 is held in recess 35 at the bottom of sleeve 34, by the spring clips 37 which are secured to the walls of the sleeve by rivets 38. The perforated closure 36 admits air while preventing foreign material from entering the weight chamber.

As an example of the vacuum regulator in operation, the device is connected to the underside of a T 7 in a vacuum line 8. With the system at rest, the weight 28 urges the outwardly extending annular flange 20 of the valve member 16 to seat on the top edge 21 of the bushing 15. When the vacuum pump is started and vacuum builds up within the system, the closed end of the valve 16 is urged upwardly by atmospheric pressure which has access through the perforated closure 36, about the sides of the weight 28 and through the bore 14 in the plate 9 and boss 11. Air under atmospheric pressure enters lines 8 through the longitudinal slots 18 in the wall of the valve member 16. When the vacuum reaches the predetermined level (determined by the number of discs 31 connected to the weight), valve member 16 assumes a partially open position. When conditions in the line change the vacuum level, the valve member adjusts its position to a more open or a more closed position to compensate for the changes. As the area of the slots 18 that are exposed to the vacuum line will be proportional to the change in the vacuum level, a more accurate and responsive control is obtained.

While we have shown and described certain embodiments of our invention, it is to be understood that it is capable of many modifications. Changes therefore in the construction and arrangement may be made without departing from the spirit and scope of the invention as disclosed in the appended claims.

We claim:
1. In a vacuum regulator, a plate with a centrally disposed boss on the upper side, a central bore therethrough, and a plurality of lugs on the lower side; a bushing insert in the bore of said boss; an elongated hollow valve member open at one end, slidably carried in said bushing, said valve member being provided with an outwardly extending annular flange seated on the upper end of the bushing and having a plurality of longitudinally extending slots through the wall between said flange and said open end; a connecting pin rigidly attached to the valve member; a weight beneath said plate adapted to abut said lugs to limit the opening movement of the valve member, means flexibly attaching said weight to said connecting pin and depending therefrom; a transparent sleeve attached to said plate surrounding said weight; and a removable perforated closure attached to said sleeve beneath the weight.

2. In a vacuum regulator, a plate with a centrally disposed boss on the upper side, a central bore therethrough, and a plurality of generally horizontally coplanar lugs on the lower side; a bushing insert in the bore of said boss; an elongated hollow valve member open at one end, slidably carried in said bushing, said valve member being provided with an outwardly extending annular flange seated on the upper end of the bushing and having a plurality of longitudinally extending slots through the wall between said flange and said open end; a connecting pin rigidly attached to the valve member; a weight beneath said plate and having a generally horizontally coplanar surface adapted to abut said lugs to limit the opening movement of the valve member; means flexibly attaching said weight to said connecting pin and depending therefrom; a transparent sleeve attached to said plate surrounding said weight; and means defining an opening into said sleeve.

3. In a vacuum regulator, a plate having an upright central tubular portion therethrough, and a plurality of generally horizontally coplanar lugs on a lower side; an elongated hollow valve member open at one end and slidably carried in said tubular portion, said valve member having an outwardly extending stop seated on the upper end of the tubular portion and a plurality of longitudinally extending slots through a wall between said stop and said open end; a weight beneath said plate and having a generally horizontally coplanar surface adapted to abut said lugs to limit the opening movement of the valve member; means flexibly attaching said weight to said valve member with said weight depending therefrom; and a housing attached to said plate and surrounding said weight, said housing having openings providing communication to the interior thereof.

4. In a vacuum regulator, a plate with a centrally disposed boss on the upper side, a central tubular portion therethrough, and a plurality of lugs on the lower side; an elongated hollow valve member open at one end, slidably carried in said tubular portion, said valve member being provided with an outwardly extending annular flange seated on the upper end of the tubular portion and having a plurality of longitudinally extending slots through the wall between said flange and said open end, said slots having portions extending outwardly past said upper end during normal operation and the area of said slots varying gradually in response to movement of the valve member with respect to said upper end and defining flow metering passage means for precisely varying fluid flow through said valve member; a weight beneath said plate adapted to abut said lugs to limit opening movement of the valve member; means flexibily attaching said weight to said valve member and depending therefrom; a housing attached to said plate and surrounding said weight.

References Cited in the file of this patent
UNITED STATES PATENTS

| | | |
|---|---|---|
| 156,165 | Jonson | Oct. 20, 1874 |
| 1,140,630 | Sutton | May 25, 1915 |
| 1,420,035 | Hall | June 20, 1922 |
| 2,069,309 | Henszey | Feb. 2, 1937 |
| 2,676,560 | Thomas | Apr. 27, 1954 |

FOREIGN PATENTS

| | | |
|---|---|---|
| 14,528 | France | Oct. 16, 1855 |
| 538,437 | Belgium | June 15, 1955 |